United States Patent

Parise et al.

[11] Patent Number: 5,545,314
[45] Date of Patent: Aug. 13, 1996

[54] SHOWER WATER FILTER ASSEMBLY

[76] Inventors: Michael C. Parise, 320 Coney Island Dr., Sparks, Nev. 89431; Myrl J. Saarem, 2057 W. Washington, Carson City, Nev. 89703

[21] Appl. No.: 367,701

[22] Filed: Jan. 3, 1995

[51] Int. Cl.⁶ ............................ B01D 35/02; B01D 27/10
[52] U.S. Cl. ................... 210/100; 4/597; 4/615; 210/282; 210/449; 210/460
[58] Field of Search ...................... 210/100, 232, 210/282, 449, 497.01, 459, 460; 4/605, 606, 615

[56] References Cited

U.S. PATENT DOCUMENTS

| | | | |
|---|---|---|---|
| 1,056,811 | 3/1913 | McElroy | 210/449 |
| 1,774,004 | 8/1930 | Haslett | 210/449 |
| 2,690,930 | 10/1954 | Corson | 210/449 |
| 3,979,096 | 9/1976 | Zieger | 4/615 |
| 4,911,840 | 3/1990 | Underwood | 210/449 |
| 4,964,573 | 10/1990 | Lipski | 4/615 |
| 5,008,011 | 4/1991 | Underwood | 210/232 |
| 5,070,553 | 12/1991 | Chambers | 4/597 |
| 5,213,688 | 5/1993 | Robinson | 4/615 |
| 5,300,224 | 4/1994 | Farley | 210/282 |
| 5,385,667 | 1/1995 | Steger | 210/449 |

*Primary Examiner*—Joseph W. Drodge
*Attorney, Agent, or Firm*—James M. Ritchey

[57] ABSTRACT

A shower water filter assembly which includes an elongated housing containing a cartridge of filter media, and which is connected to the water outlet in a shower. In order to permit the elongated housing to have sufficient length to efficiently perform a filtering function, a flexible hose is coupled to the bottom of the housing and extends through a tubular wand to the shower head. The wand and shower head are supported, for example, on the side of the cylindrical housing so as to provide sufficient elevation for the shower head for normal shower use. Alternatively, the wand and shower head may be removed from the supporting bracket and used manually for the shower.

10 Claims, 3 Drawing Sheets

SHOWER WATER FILTER ASSEMBLY

BACKGROUND OF THE INVENTION

A shower water filter assembly is provided for filtering harmful substances, such as chlorine, trihalomethanes, volatile organic compounds, and odors from the shower water. The principal purpose of the filter assembly of the invention is to filter out chlorine from the shower water which is absorbed more by the human body during showers than by drinking the water.

As discussed in detail in U.S. Pat. No. 5,300,224, which issued Apr. 8, 1994 to Frederick A. Farley, for over a hundred years the recognition and linking of macroscopic and microscopic pathogens to the aesthetic and health qualities of water has resulted in a search for effective water disinfection and treatment procedures. The introduction of water chlorinization, as a continuous water disinfecting process, occurred soon after the turn of the century. Today, approximately 80% of all potable water systems in the United States use chlorine as a water disinfectant.

However, the treatment of water with chlorine has certain side effects. Even in lower concentrations, such as originally used by commercial food processors and bottlers, chlorine creates an objectionable odor and taste. Also, as chlorine is added to water containing pathogenic microorganisms, the highly reactive chlorine combines with fatty acids and carbon fragments to form a variety of toxic compounds.

Recent studies have indicated that chlorine and the compounds which chlorine forms in water can be inhaled and absorbed through the skin by persons during bathing or showering. According to research findings presented at a meeting of the American Chemical Society in the 1980's, it was shown that the taking of long, hot showers is a health risk. In summary, this presentation stated that taking showers, and to a lesser extent, baths, leads to a greater exposure to toxic chemicals contained in the water than does drinking the water. Due to the increased temperatures and surface area, the chemicals evaporate out of the hot water and are absorbed through the skin. Moreover, the chlorine also escapes to the surrounding air and can be harmful to persons breathing the air around showers and baths, and thus increasing the chance of harmful exposure beyond that which such persons would encounter by actually drinking the water.

Accordingly, shower filter assemblies have been proposed in the past for filtering out chlorine and chlorine compounds from the shower water. Such filter assemblies are described, for example, in U.S. Pat. Nos. 5,300,224; 5,008,011; 5,152,464; and 4,933,080.

The prior art shower filters comprise, for the most part, short cylindrical housings which contain the filtering compound, and which are interposed between the shower outlet pipe and the shower head. Such housings must be relatively short, or else the actual shower head would be lowered to an inconvenient height insofar as the person taking the shower is concerned. However, short filter housings have the disadvantage of producing a relatively short dwell time of the water flowing through the filter media, and this decreases the filtration efficiency. Insofar as the prior art assemblies are concerned, any lengthening of the filter housing would serve to lower the location of the shower head to an inconvenient height that would be too low for normal use of the shower by most persons.

The filter assembly of the present invention utilizes a filter housing that may be relatively long so that efficient filtering action may be realized. In accordance with the invention, the shower head is coupled to the bottom of the filter through a tubular wand and a flexible hose. The wand may be supported on an appropriate bracket on the side of the filter housing, and the shower head itself may be elevated to any convenient height, despite the fact that the filter housing extends down into the shower booth. Also, if desired, the wand may be lifted up off the bracket, and used manually for a shower without any obstruction being encountered due to the length of the filter housing.

DETAILED DESCRIPTION OF THE ILLUSTRATED EMBODIMENTS

Figure 2:
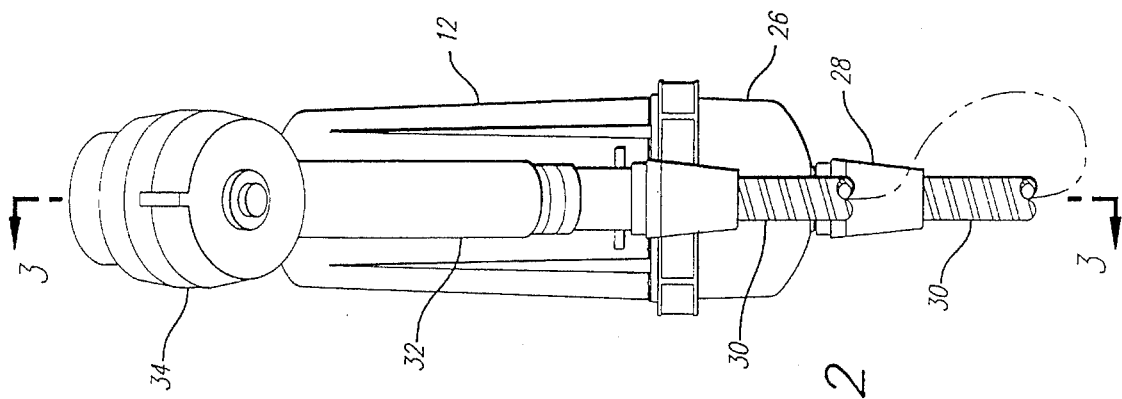
FIG. 2 is an elevational view of the embodiment of FIG. 1 turned 90 degrees about its longitudinal axis.
Figure 1:
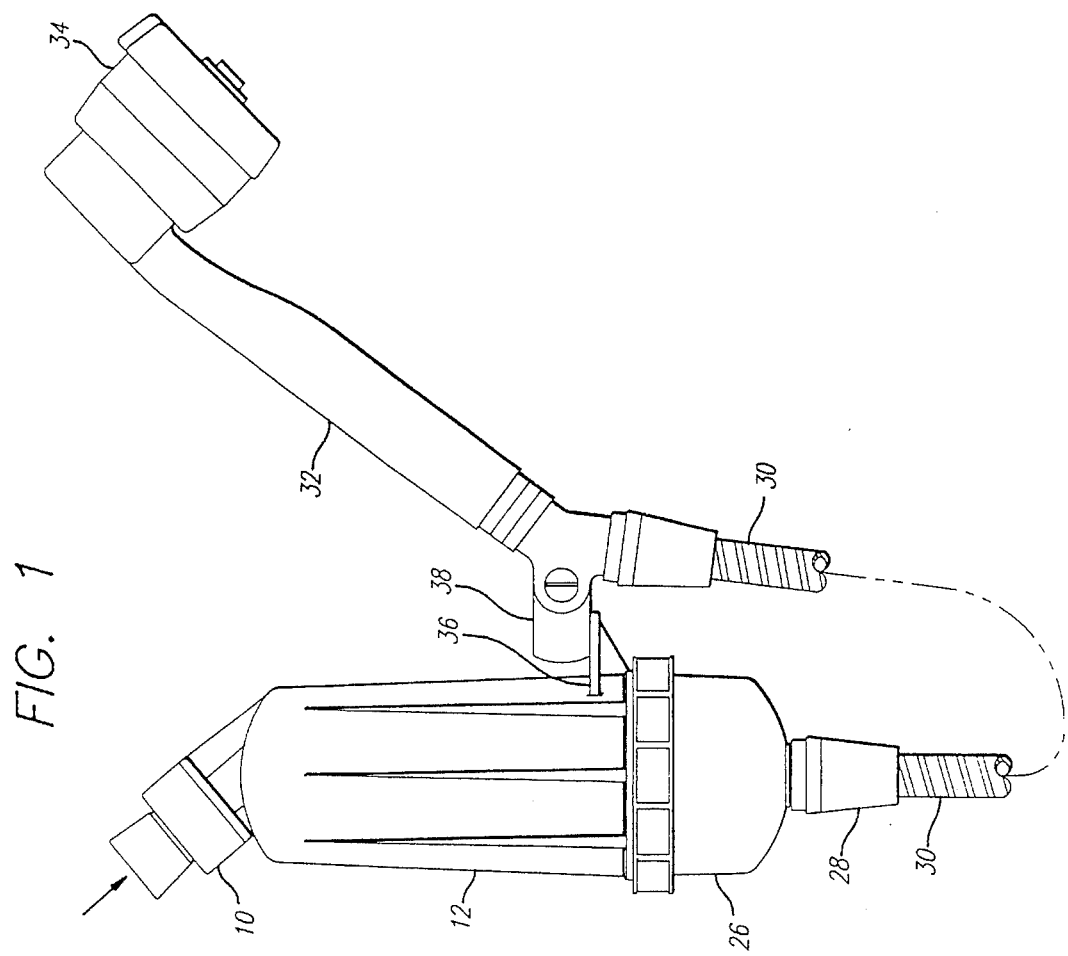
FIG. 1 is an elevational view of a shower filter assembly representing one embodiment of the invention which includes an elongated filter housing and a shower head coupled to the housing through a tubular wand and flexible hose, and supported on a bracket on the side of the elongated housing.
Figure 3:
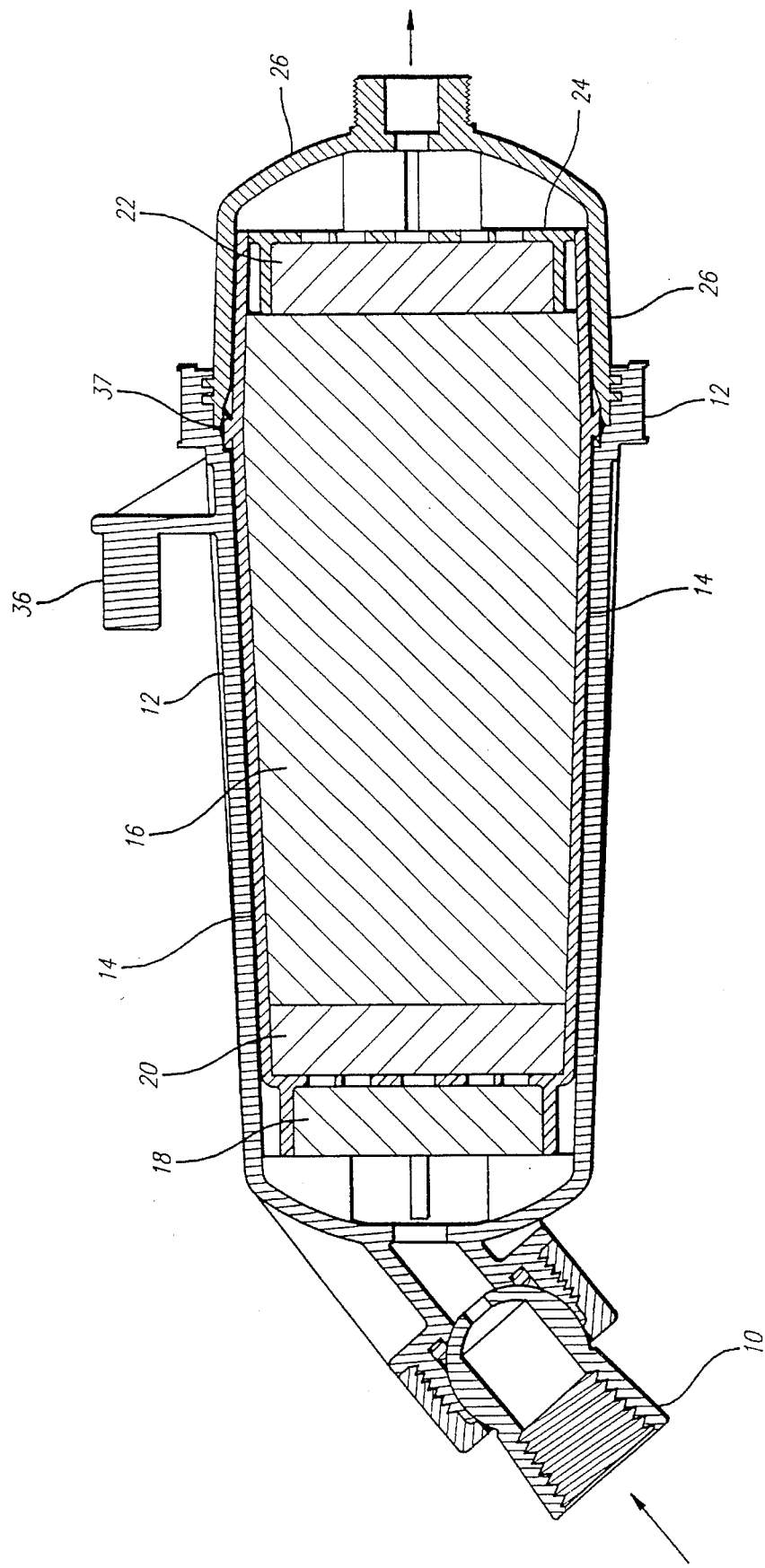
FIG. 3 is a side sectional view of the filter assembly taken substantially along the line 3—3 of FIG. 2.

The shower filter assembly shown in FIGS. 1, 2 and 3 is appropriate for filtering chlorine, and other substances such as those referred to above, out of the shower water.

The assembly may be attached to the conventional shower water supply pipe by means, for example, of a universal ball-and-socket coupler 10 which permits the assembly to be angularly adjusted to any desired position.

The coupler 10 defines a passage for the shower water from the supply pipe into the interior of an elongated cylindrical housing 12. Housing 12 contains a replaceable filter cartridge 14, which, in turn, contains appropriate filtering media 16, such as carbon granules.

The filter cartridge 14 supports an external porous filter pad 18 at the apertured inlet end of the cartridge. The porous pad 18 is formed of appropriate materials for filtering relatively large particles out of the shower water. A second porous pad 20 is supported within the filter cartridge at the inlet end. Yet another porous pad 22 is supported within the cartridge 14 at the outlet end. An apertured end plug 24 is fitted into the outlet end of the cartridge, for example, by a snap-fit engagement.

A cap 26 is threaded to the outlet end of the cylindrical housing 12 to hold the cartridge 14 in place, and to permit removal and replacement of the cartridge. Cap 26 defines a fitting for receiving a coupler 28 (FIGS. 1 and 2) which is mounted at one end of a flexible hose 30. Hose 30 is coupled to a conventional tubular wand 32, and a conventional shower head 34 is mounted on the distal end of the wand.

The wand 32 and shower head 34 may be supported on a bracket 36 by means of an arm 38 attached to the wand. Bracket 36 is mounted on the side of the cylindrical housing 12. Arm 38 may be set to any desired angular position so as to establish the inclination of the wand and shower head. If so desired, the shower may be operated with the wand in place on the bracket 36, as shown in FIGS. 1 and 2. Alternatively, the wand may be hand-held in accordance with conventional practice.

In either event, cylindrical housing 12 may be made sufficiently long to enable the filter efficiently to perform its filtering function, and yet permitting the shower head 34 to be held at an appropriate height so as not to interfere with the person taking the shower.

Figure 4:
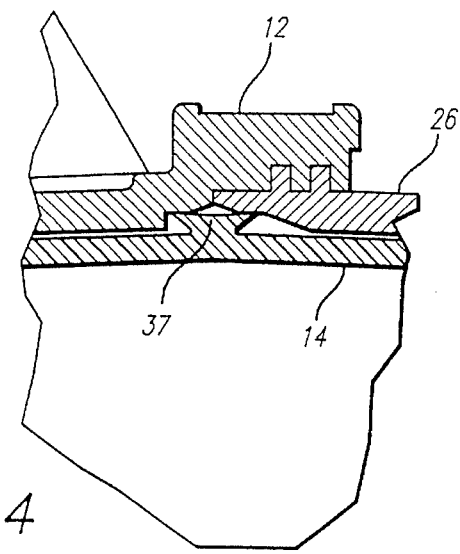
FIG. 4 is an enlarged fragmentary sectional view of the joint between the filter housing and a filter housing cap, these elements being included in the embodiment of FIGS. 1-3.

An integral seal 37 is formed on cartridge 14 in the vicinity of the threaded joint between the housing 12 and cap 26, as better shown in the enlarged fragmentary view of FIG. 4. The seal prevents any leakage of water from the inlet to the outlet around the filter cartridge, and it also prevents any external leakage of the water through the joint. The seal is double-lipped, and it is pressure energized. Since the seal is part of the cartridge, it is replaced each time the cartridge is replaced. As an alternative, O-rings (not shown) may be mounted between cartridge 16 and housing 12 and cap 26.

Figure 5:
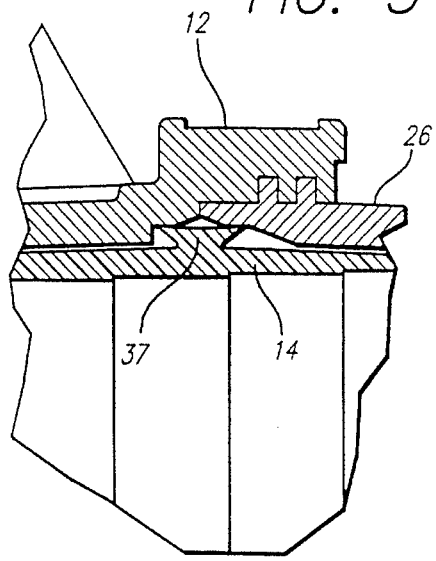
FIG. 5 is a fragmentary sectional view, like FIG. 3, and showing a filter cartridge contained in the filter housing and having a stepped inner bore surface.

In the embodiment of FIG. 5, the bore of the filter cartridge 14 is stepped to enhance mixing of the shower water and the filter media.

Figure 6:
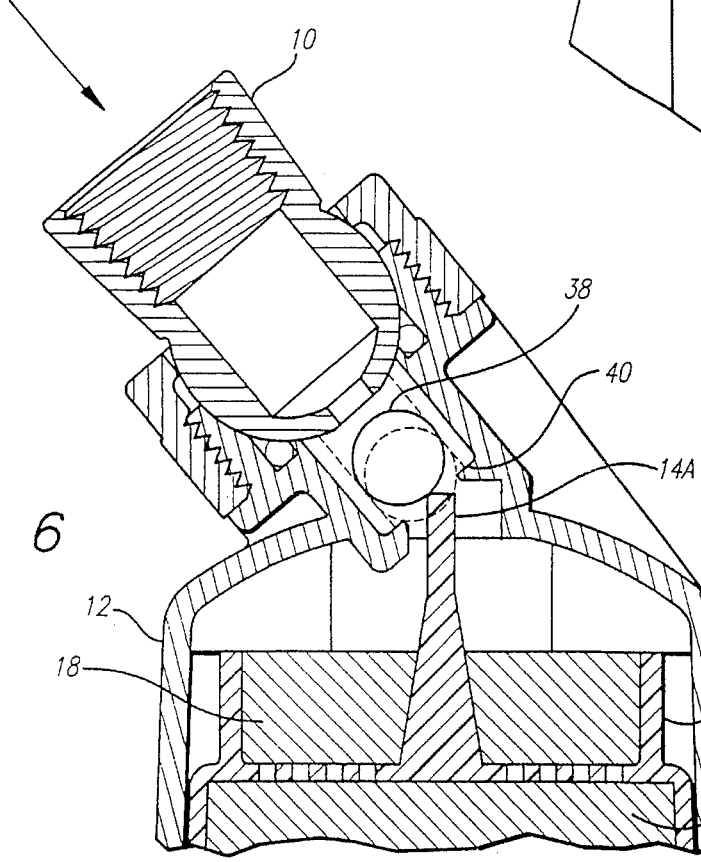
FIG. 6 is a fragmentary sectional view showing a modified version of the shower filter assembly of the invention.

In the embodiment of FIG. 6, a ball seal 38 is included in the coupler 14, and the ball normally bears against a seat 40 to prevent the flow of water through the unit whenever the cartridge 14 is not contained in the housing 12. However, when the cartridge is inserted into the housing 12, a projection 14A extending from the inlet end of the cartridge bears against the ball 38 and forces it away from its seat 40 so that water is then free to flow through the filter cartridge.

While particular embodiments of the invention have been shown and described, modifications may be made, and it is intended in the following claims to cover all such modifications which fall within the true spirit and scope of the invention.

We claim:

1. A shower filter assembly including: a housing having an elongated cylindrical configuration; a cylindrical cartridge containing filter media removably mounted in said housing in coaxial relationship therewith; a coupling member mounted at one end of the housing for attaching the housing to a water outlet; a flexible hose member having a first end connected to the other end of said housing for receiving filtered water from said housing; a tubular elongated wand connected to the other end of said flexible hose member; a shower head connected to the distal end of said wand; and bracket means mounted on the housing for removably supporting said tubular elongated wand and said shower head during the operation of the filter assembly with said wand extending upwardly from the lower end of the housing and inclined outwardly from the housing.

2. The shower filter assembly defined in claim 1, in which said bracket means is secured to one side of said housing, and which includes an arm mounted on said wand for removably supporting said wand and said shower head on said bracket means.

3. The shower filter assembly defined in claim 2, in which said arm is angularly adjustable.

4. The shower filter assembly defined in claim 1, in which said coupling member includes a valve having a movable member therein and a seat for receiving the movable member, said movable member engaging said seat to prevent water flow through said coupling member when said cartridge is removed from said housing, and in which said cartridge includes a projecting member positioned to engage said movable member in said valve and lift said movable member off said seat when said cartridge is in place in said housing.

5. The shower filter assembly defined in claim 1, and which includes a cap removably coupled to said housing to hold said cartridge in said housing and to permit removal of said cartridge from said housing when the cap is removed.

6. The shower filter assembly defined in claim 5, and which includes an annular sealing member formed integrally with said cartridge and providing a seal between said cap and said housing.

7. The shower filter assembly defined in claim 6, in which said sealing member is a double-lipped flexible seal configured to be pressure energized into a sealing position.

8. The shower filter assembly defined in claim 1, in which the bore of said cartridge has a stepped configuration to enhance mixing of water flowing through said cartridge and the filter media contained therein.

9. The shower filter assembly defined in claim 1, in which said coupling member is mounted on said housing by a ball-and-socket sub-assembly.

10. The shower filter assembly defined in claim 1, and which includes an apertured plug fitted into said other end of the cartridge in snap fit relationship therewith.

* * * * *